United States Patent [19]

Nomura et al.

[11] 4,092,688

[45] May 30, 1978

[54] MULTI-TRACK THIN FILM MAGNETIC HEAD

[75] Inventors: Noboru Nomura, Kyoto; Kenji Kanai, Neyagawa; Nobuyuki Kaminaka, Moriguchi; Norimoto Nouchi, Katano, all of Japan

[73] Assignee: Matsushita Electric Industrial Co. Ltd., Kadoma, Japan

[21] Appl. No.: 709,102

[22] Filed: Jul. 27, 1976

[30] Foreign Application Priority Data

Jul. 31, 1975 Japan .................................. 50-94029
Jul. 31, 1975 Japan .................................. 50-94030

[51] Int. Cl.² .......................... G11B 5/28; G11B 5/20; G11B 5/47
[52] U.S. Cl. .................................. 360/121; 360/123; 360/126; 360/66
[58] Field of Search .............................. 360/120–123, 360/126, 125, 120, 66

[56] References Cited

U.S. PATENT DOCUMENTS

| | | | |
|---|---|---|---|
| 3,639,699 | 2/1972 | Tiemann | 360/126 |
| 3,723,665 | 3/1973 | Lazzari et al. | 360/123 |
| 3,829,896 | 8/1954 | Brock et al. | 360/123 |
| 3,846,841 | 11/1974 | Lazzari et al. | 360/121 |
| 3,846,842 | 11/1974 | Lazzari et al. | 360/123 |
| 3,891,995 | 6/1975 | Hanazono et al. | 360/123 |
| 3,987,488 | 10/1976 | Kanai et al. | 360/121 |

OTHER PUBLICATIONS

IBM Tech. Disc. Bulletin, Thompson, Multigap Recording Head, vol. 12, No. 10, Mar. 1970, p. 1555.

*Primary Examiner*—Alfred H. Eddleman

[57] ABSTRACT

A bias conductor layer for a bias current path extends through the gaps of a plurality of unit thin-film magnetic heads, which are placed side by side over signal conductor layers. A spacer layer is provided between upper and lower magnetic material layers and extends over the area including the gaps formed between the bias conductor layer and the signal conductor layers, and an additional thickness of spacer material is provided at the gaps so that the distance between the upper and lower magnetic material layers is increased and therefore magnetic short-circuiting is avoided.

9 Claims, 6 Drawing Figures

MULTI-TRACK THIN FILM MAGNETIC HEAD

BACKGROUND OF THE INVENTION

This invention relates to a thin film magnetic head wherein head elements such as magnetic cores, windings, etc. are composed of thin layers placed on a substrate by thin film technology, and more particularly pertains to a multi-track magnetic head which is constructed by forming a plurality on unit thin film magnetic heads of the same substrate.

A thin film magnetic head generally has a basic construction in which a magnetic material layer is deposited on a substrate of magnetic material, with a conductor layer interposed therebetween. The substrate and the magnetic material layer constitute a magnetic circuit, the rear end of the layer being magnetically connected to the substrate and the front end being magnetically separated from the substrate to form a recording gap. Electric current is caused to flow through the conductor for recording. The current intensity must be sufficient to magnetize the magnetic medium such as a disc, tape, drum, etc. The cross-section of the conductor layer, however, is small, so that it is not adequate to carry a large current. However, when the heads of a multi-track head comprising a plurality of such unit heads are energized, the total current required is quite large.

To solve such problems, it has been suggested provide a bias conductor layer for supplying, recording bias to the unit heads in addition to a signal conductor layer for supplying signal current to each unit head respectively. Such a bias conductor layer can be constructed as shown in FIG. 2, for example. Referring to FIG. 2, the area of each unit head is defined by a magnetic material layer 2 deposited on a substrate 1. A separate signal conductor layer 3 is provided for to each unit head. A bias conductor layer 4 is provided in the same plane as the signal conductor layer and extends through a plurality of the unit heads.

The cross-sectional view of construction of a conventional head having such a plan view construction is shown in FIG. 1. Referring to FIG. 1, numeral 101 designates a substrate, and a signal conductor layer 103 and a bias conductor layer 104 are deposited on the substrate 101, with a gap 106 therebetween. A magnetic material layer 102 is deposited over the two layers 103 and 104, an insulator layer 105 being interposed therebetween.

In such a construction, however, recording efficiency is very low, because, only a small signal magnetic flux can be obtained at the front gap portion even if a large current flows through the signal conductor layer 103. Therefore it has not been applicable for practical use.

The cause of the low efficiency is that the distance between the magnetic material layer 102 and the substrate 101 is small at the gap 106. The existence of this small distance causes magnetic short-circuit; that is to say, magnetic flux generated by the signal conductor layer is shorted between layer 102 and substrate 101 at the gap portion, so that such flux is not transmitted to the front gap portion for recording.

BRIEF SUMMARY OF THE INVENTION

It is an object of this invention to improve the signal flux transmission efficiency of a multi-track thin film magnetic head of the type wherein a signal conductor layer and a bias conductor layer are provided in side by side relation.

This object is achieved by the head structure of this invention wherein a spacer layer is provided at the gap formed between the signal conductor layer and the bias conductor layer, the thickness of the spacer layer being sufficient to space the two magnetic-core-elements at the gap portion so that little magnetic flux leaks between the core elements at the gap portion.

Other objects and features of this invention will become more apparent from the following detailed description.

DETAILED DESCRIPTION OF PREFERRED EMBODIMENTS

Figure 2:
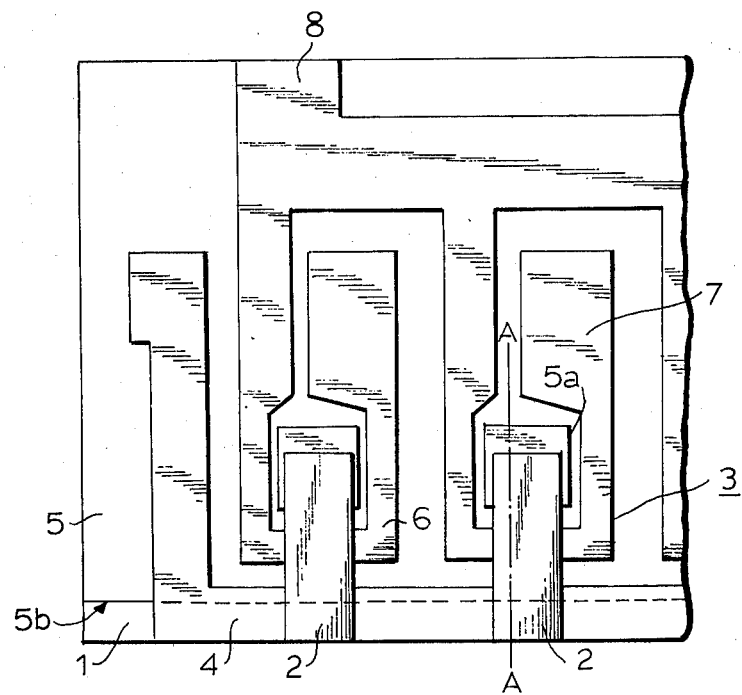
FIG. 2 is a plan view of a multi-track thin film magnetic head according to this invention.
Figure 3:
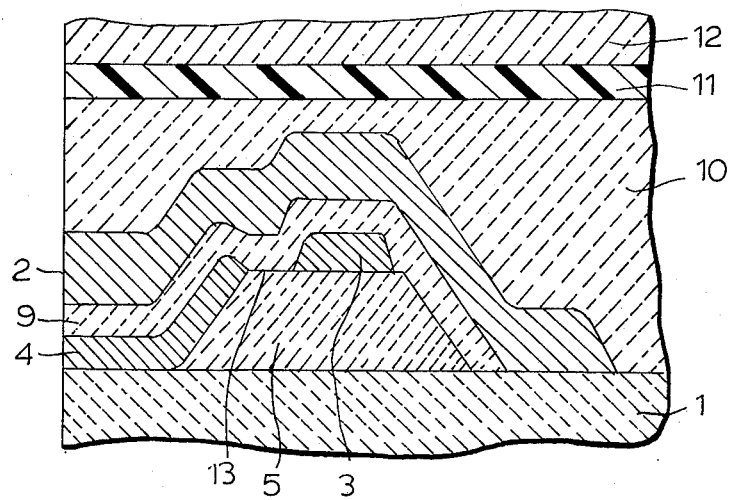
FIG. 3 is an enlarged cross-sectional view taken on line A—A of FIG. 2.

Referring to FIG. 2, the head includes a substrate 1 which is composed of ferromagnetic material which has a good insulating property, such as ferrite etc. This substrate 1 may be a thin film deposited on a thicker base. On this substrate 1 is placed a spacer layer 5 which is composed of insulating material such as SiO, $SiO_2$, $Al_2O_3$, etc. This spacer layer 5 covers the substrate 1 except at the square openings 5a and at the front portion (the bottom in FIG. 2) between the line 5b and the front edge of the head. A plurality of signal conductor layers 3 each in the form of a horseshoe-shaped loop 6 are placed on the spacer layer 5 and a bias conductor layer 4 is also placed on one side of the spacer layer 5 and on the front portion of the head between line 5b and the front edge of the substrate. Both conductor layers 3 and 4 are composed of Au, Al or Cu and are deposited simultaneously, so that they have the same thickness. Magnetic material layers 2 in the shape of the unit heads are placed above the conductor layers 3 and 4 with the rear ends, i.e. the ends remote from the front edge of substrate 1, extending through the square openings 5a to contact the substrate 1, whereby the conductor layers 3 and 4 are interposed between the substrate 1 and the magnetic material layer 2. The magnetic material layers 2 may be composed of Permalloy and deposited by evaporation or the like. Each magnetic material layer 2 thus forms a separate unit head. The horseshoe-shaped loop 6 extends under each unit head, providing a separate current path for each unit head. One end 7 of each horseshoe-shaped loop 6 forms a terminal for being connected with a respective signal source. The other end of each horseshoe-shaped loop 6 is connected with a common terminal 8 to which the other ends of the loops 6 are also connected. The bias conductor layer 4 extends through all the unit heads. As shown in FIG. 3, an insulator layer 9 is interposed between the magnetic material layer 2 and the conductor layers 3 and 4, although it is not shown in FIG. 2. On the magnetic material layer 2, an insulator layer 10 is placed. These insulator 9 and 10 may be composed of SiO or $SiO_2$. On the insulator 10, a protector layer 12 which may be composed of glass is attached by plastic 11. Of course, the terminals 7 of the conductor layers 3 and the ends of bias conductor layer 4 are exposed for being connected to a driving circuit.

As shown in FIG. 3, the gap 13 formed between each signal conductor layer 3 and the bias conductor layer 4 is located above the spacer layer 5. The thickness of this spacer layer 5 is made sufficient to keep the magnetic material layer 2 at a sufficient distance from the substrate 1 for preventing magnetic short-circuiting at the gap 13. When determining the thickness of the spacer layer 5, the thickness and the permeability of the magnetic material layer 2 and the thickness of the conductor layers 3 and 4 should be take into consideration. A head according to above embodiment having the following dimensions has been found to be satisfactory for the recited conditions the thickness of the magnetic material layer —5μ (Permalloy)
the thickness of the spacer layer —2.5μ
this thickness of the conductor layers —1μ
signal current —100 mA
bias current —600 mA An intensity of the recorded signal sufficient for practical purposes was obtained under these conditions. A similar investigation of a conventional head having corresponding dimensions showed that even a signal current of 600 mA could not achieve a recorded signal having sufficient intensity.

Figure 4:
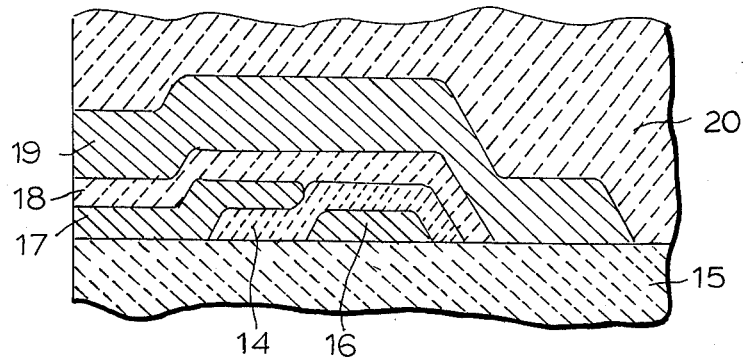
FIGS. 4, 5 and 6 are cross-sectional views of other embodiments according to this invention.

FIG. 4 illustrates a modification of the head of FIG. 3 wherein the manner of providing the spacer layer 14 differs from FIG. 3. In this embodiment, a signal conductor layer 16 is deposited before to a bias conductor layer 17 is deposited. The spacer layer 14 is located above the signal conductor layer 16 and a part of the bias conductor layer 17 is deposited over the front edge of the spacer layer 14. The bias layer 17 is thus located close to the signal conductor layer 16, but is separated therefrom by the spacer layer 14 in a direction perpendicular to the substrate as well as along the substrate. Other elements such as insulator layers 18 and 20 are provided in the same manner as those in FIG. 3.

Figure 5:
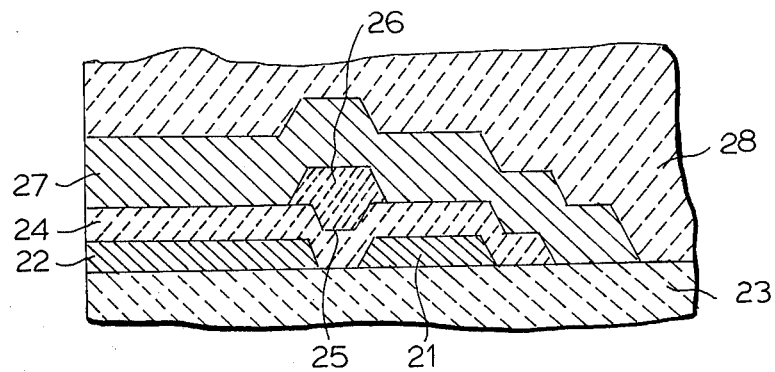

A further modification is illustrated in FIG. 5. In this embodiment, a signal conductor layer 21 and a bias conductor layer 22 are simultaneously provided on a substrate 23 and above them is placed on insulator layer 24 as in the conventional head. A further spacer layer 26 is placed on the insulator layer 24 so as to fill a depression 25 formed in layer 24 over the gap between the two conductor layers 21 and 22.

Above these elements are placed, a magnetic material layer 27 and an insulator layer 28 and other elements as in the embodiment of FIG. 3.

Figure 6:
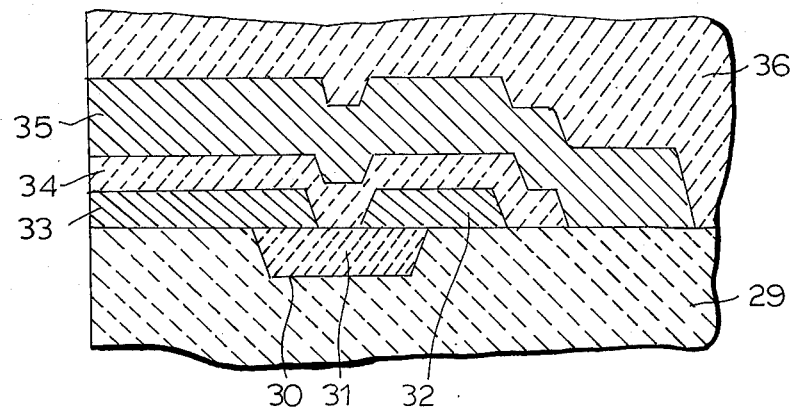

In the embodiment shown in FIG. 6, a substrate 29 of magnetic material is provided with a recess 30 by etching. The recess 30 is filled with non-magnetic material 31 which may be glass, $SiO_2$ etc. A signal conductor layer 32 and a bias conductor layer 33 are formed on the substrate 29 in such a manner that the gap between the two layers 32 and 33 is located above the recess 30.

Figure 1:
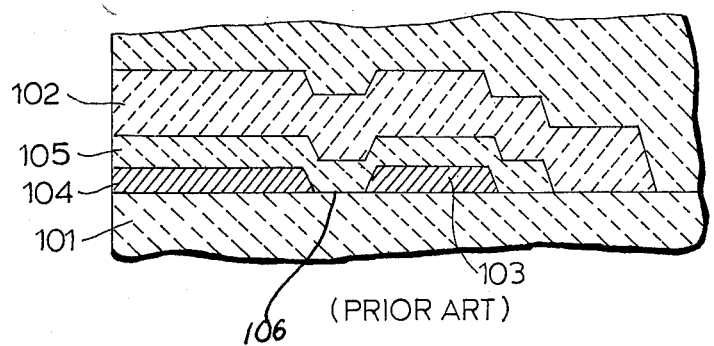
FIG. 1 is a cross-sectional view of a conventional thin film head having a signal conductor layer and a bias conductor layer in the same plane.

An insulator layer 34, magnetic material layer 35 and insulator layer 36 are formed in a similar manner to the prior art embodiment of FIG. 1. The non-magnetic material 31 acts as a spacing layer for increasing the distance between the two magnetic material layers 29 and 35 at the gap between the conductors 32 and 33.

What is claimed is:

1. A multi-track thin film magnetic head having a plurality of unit magnetic heads and comprising:
   a first generally plane magnetic material layer;
   a plurality of first elongated flat plane conductor layers deposited in a row on said first magnetic material layer and spaced from each other in the direction of the length of said row and each being in the shape of an inductive loop for a respective unit magnetic head;
   a second elongated conductor layer deposited on said first magnetic material layer and extending along said row and adjacent to and spaced from said plurality of first conductor layers for leaving gaps between each of said first conductor layers and said second conductor layer;
   a plurality of separate second magnetic layers, one for each first conductor layer, deposited over said first and second conductor layers at positions along said row corresponding to the positions of said first conductor layers and being magnetically coupled to said first magnetic material layer through the loops of the respective first conductor layers; and
   a thickness of magnetically insulating material at each of said gaps and having a dimension in the direction of the spacing between said first and second magnetic material layers, whereby said first and second magnetic material layers are sufficiently magnetically insulated from each other to prevent magnetic flux short-circuiting.

2. A multi-track thin film magnetic head having a plurality of unit magnetic heads and comprising:
   a first generally plane magnetic material layer;
   a plurality of first elongated flat plane conductor layers deposited in a row on said first magnetic material layer and spaced from each other in the direction of the length of said row and each being in the shape of an inductive loop for a respective unit magnetic head;
   a second elongated conductor layer deposited on said first magnetic material layer and extending along said row and adjacent to and spaced from said plurality of first conductor layers for leaving gaps between each of said first conductor layers and said second conductor layer;
   a plurality of separate second magnetic layers, one for each first conductor layer, deposited over said first and second conductor layers at positions along said row corresponding to the positions of said first conductor layers and being magnetically coupled to said first magnetic material layer through the loops of the respective first conductor layers; and
   a spacer layer of magnetically insulating material between said first and second magnetic material layers and extending over the area including said gaps between said first and second conductor layers in each unit head; and
   an additional thickness of magnetically insulating material at each of said gaps and having a dimension in the direction of the spacing between said first and second magnetic material layers, whereby said first and second magnetic material layers are sufficiently magnetically insulated from each other to prevent magnetic flux short-circuiting.

3. A multi-track thin film magnetic head as claimed in claim 2 in which said additional thickness of magnetically insulating material is on said first magnetic material layer and extends along said layer toward said second conductor layer a distance at least as great as the gap dimension in the direction between said conductor layers, said first conductor layers being on said additional thickness of magnetically insulating material and said spacer layer being between said conductor layers and said second magnetic material layers and filling the gaps between said first and second conductor layers.

4. A multi-track thin film magnetic head as claimed in claim 3 in which the edge of said second conductor layer closest to said first conductor layer overlaps said additional thickness.

5. A multi-track thin film magnetic head as claimed in claim 2 in which said first conductor layers and second conductor layer are on said first magnetic material layer, and said additional thickness of magnetically insulating material overlies said first conductor layers and fills the gaps between said first conductors and said second conductor, and said spacer layer being between said second conductor layer and said second magnetic material layers and between said additional thickness and said second magnetic material layers.

6. A multi-track thin film magnetic head as claimed in claim 5 in which the edge of said second conductor layer closest to said first conductor layers overlaps said additional thickness.

7. A multi-track thin film magnetic head as claimed in claim 2 in which said first conductor layer and said second conductor layer are on said first magnetic material layer and said spacer layer overlies said conductor layers and fills the gaps between said first and second conductor layers and has depressions therein corresponding to said gaps on the side remote from said conductor layers, said additional thickness at least filling said depressions, and said second magnetic material layers overlying said spacer layer and said additional thickness.

8. A multi-track thin film magnetic head as claimed in claim 2 in which said additional thickness has a dimension in the direction of the space between said first and second magnetic material layers greater than the dimension of said depressions in the same direction.

9. A multi-track thin film magnetic head as claimed in claim 2 in which said first magnetic material layer has a recess therein beneath the gaps between said first conductor layers and said second conductor layers and said additional thickness filling said recess and said spacer layer overlying the first and second conductor layers and filling the gaps between said first conductor layers and said second conductor layer.

* * * * *